Jan. 24, 1967  J. LLOBET  3,299,551
DISPLAY DEVICE
Filed Oct. 28, 1963
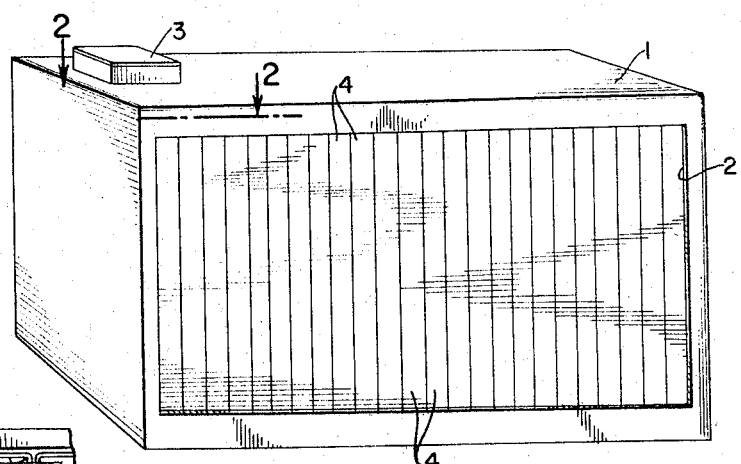
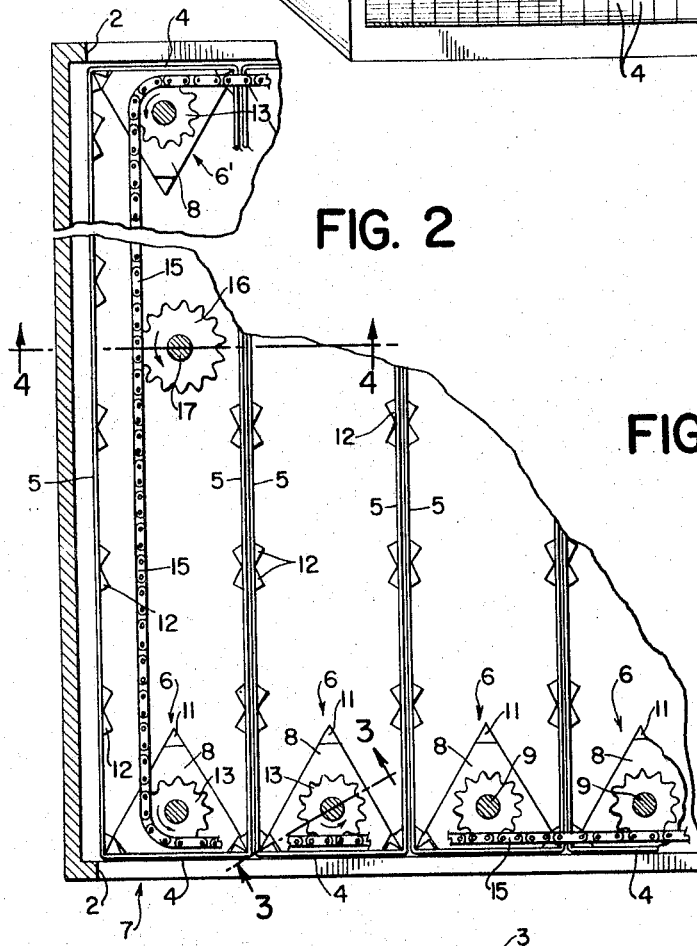
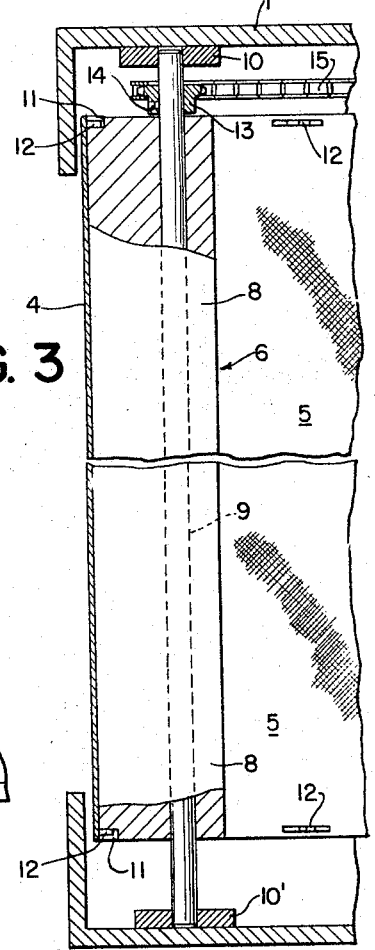
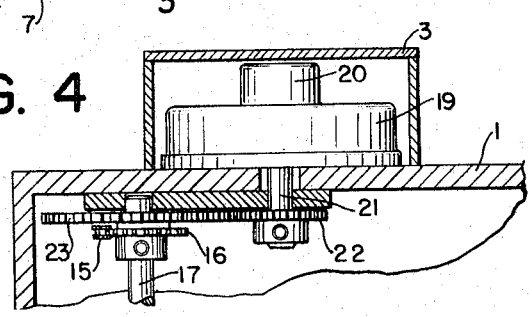
INVENTOR.
JOSEP LLOBET
BY
ATTORNEYS 3,299,551
DISPLAY DEVICE
Josep Llobet, 24—15 21st Ave., Astoria,
Long Island, N.Y. 11102
Filed Oct. 28, 1963, Ser. No. 319,485
2 Claims. (Cl. 40—32)

The present invention relates to devices for displaying images and has for its object the provision of an improved display device for rapidly presenting in a selected sequence a plurality of images such as may be used for advertisements, pictures or other visual effects.

The display device of the invention comprises a number of similar image segment conveyors each carrying a series of image segments and means for moving each of the image segment conveyors in increments with the provision of means for holding the conveyors stationary for selected time periods while selected image segments are in a viewing plane whereby the image segments in view form a composite image.

In a presently advantageous embodiment, this invention provides a display device operatably mounted in a housing having two openings for viewing the images, a plurality of image segments capable of arrangement in said display openings. Each image segment conveyor of the device includes a display band which carries the image segments and a pair of rotatable supports. The conveyors are arranged and driven in such a manner that a sequence of composite images may be rapidly presented.

Heretofore, devices for displaying outdoor and indoor advertisements, prints, pictures and other images have had many disadvantages and limitations and, particularly, have had drawbacks in respect to effectively presenting a large number of different images during a single uninterrupted sequence. The use of motion picture projections have not proved satisfactory, particularly for outdoor daytime displays. Devices other than motion picture projections are unable to change from one image to another with the rapidity characteristic of the present invention. The present invention overcomes these disadvantages and limitations by providing a device capable of rapidly and effectively displaying in a selected sequence a large number of different images.

It is a feature of the invention that the display of the composite image may be changed rapidly since the entire image is not required to be moved into and out of the display openings. Instead, each segment of the image is required to be moved only a short distance. The invention is particularly adaptable to advertising displays in that the width and size of image segments are substantially less than the composite image thus permitting rapid change of the displays.

It is also a feature of the invention that a large number of images may be displayed in a single sequence. Heretofore, display devices have been limited to presentation of a sequence having only a few images. My invention permits effective display of a large number of images.

It should be noted that the front and back of the housing of the illustrated embodiment of my device are removed to provide two display openings. A frame not enclosed may alternatively be used to permit viewing of the display bands from any position.

The accompanying drawings illustrate an embodiment of the invention, in which FIG. 1 is a perspective view of the device, FIG. 2 is an enlarged partial sectional view through line 2—2 of FIG. 1, FIG. 3 is an enlarged partial sectional view through line 3—3 of FIG. 2 and FIG. 4 is a partial sectional view through line 4—4 of FIG. 2.

The device illustrated in the drawings comprises a support in the form of a frame or housing 1, having openings 2 and 2' in its front and back sides, respectively, for viewing the composite images displayed on the plurality of image segments 4. Mounted on top of said housing 1 is a motor unit and timer enclosure 3. Each composite image may be formed of any suitable number of image segments, the use of twenty-four (24), as shown in FIG. 1, having been found satisfactory. Image segments 4 are positioned on display bands 5 for movement into the position shown in FIG. 1 in which the segments present a planar viewing surface. Another group of image segments form an additional composite image simultaneously in the back opening 2'. Each display band 5, together with a pair of spaced-apart rotatable supports or members 6, comprises an image segment conveyor 7.

The image segments 4 have on their outside or exposed surfaces, images or parts of images, such as letters, words, drawings, photographs or the like applied on or attached to the bands in any suitable manner which when aligned with the other image segments present a composite picture or concept.

The display device comprises several identical image-bearing segment conveyors which are operated in unison by a single driving means. For convenience, only one of the image conveyors will be described in detail.

Each of the image segment conveyors 7 functions to move the image segments carried on the display band 5 into the viewing plane or position, which as illustrated in the drawing, are display openings 2 and 2' in the housing. Each conveyor 7 has two rotatable supports 6 and 6', support 6 being positioned adjacent the front display opening 2 for positioning of selected segment images for display at that viewing surface and the other support 6' being positioned in the rear portion of the housing frame 1 and adjacent back display opening 2'. Rotatable supports, including more than one rotating element may be used, if desired, to facilitate support, movement and presentation of the image segment in the display openings. The conveyors 7 are nested parallel to one another to cause the image segments 4 on which there is displayed a composite image to be positioned in proper alignment in the viewing plane. Alternative arrangements of the conveyors for forming composite images having curved configurations may also be used, it being understood that the viewing position or plane may be formed in any desired configuration.

Each band 5 is supported and moved by the action of rotatable supports 6 and 6' which have shafts 9 mounted for rotation in bearings 10 and 10'. The triangular-shaped drums 8 which carry the display bands are affixed to shafts 9. Drums 8 have notches 11 cut in their ends which engage with display band support projections 12 for positive drive of the bands. The display bands are supported and moved by rotation of the drums through action of the notches and projections and through frictional engagement of the drum surface with the inside of the display bands.

Sprockets 13 which are adjustably mounted on the upper ends of shafts 9 through set screws 14 engage with chain 15 which is in turn driven by drive gear 16 mounted on shaft 17. A sprocket and chain arrangement engaging the lower ends of the shafts may also be used to provide additional driving means for the rotatable supports. Gear 16 is driven by motor or solenoid unit 19 through motor shaft 21 and gear 22.

The rotation of gear 16 moves drive chain 15 which in turn causes the rotation of sprockets 13, drums 8 and movement of display bands 5. The incremental movement of the drive chains to rotate the drums one-third of a turn moves a new set or group of image segments into view in the display openings.

Each display band 5 has a series of image segments 4 positioned on it, the segments having dimensions substantially equal to the sides of the drums. The display bands 5 are constructed of a single unitary piece of flexible material with a series of semi-rigid elements corresponding in shape to the drum sides mounted thereon. Alternatively, the bands may be made from a single unitary piece of flexible material having the image segments imprinted directly on the band.

It should be noted that chain 15 as shown in FIG. 2 has portions removed to facilitate illustration of the details of engagement of drum notches 11 with engaging support projections 12. Drums 8 having cross sections of any desired configuration may be used; however, drums of triangular cross sections as shown are preferred.

In FIG. 4 there is shown a motor or solenoid unit 19 which is caused to rotate in accordance with signals received from timer unit 20 to drive shaft 21 having gear 22 mounted thereon which in turn engages gear 23 on shaft 17. Shaft 17 has gear 16 mounted on it for engagement with chain 15.

In the operation of the illustrated device in accordance with my invention, the display bands 5 are moved on their respective conveyors 7 until the image segments are aligned to form the desired sequence of composite images. The drive chain 15 is engaged with sprockets 13 which are then adjusted relative to shafts 9 through set screws 14, as necessary, to accurately align the drum sides to assure that the composite image is uniformly positioned in the display planes. When drive gear 16 is rotated counterclockwise by rotation of drive shaft 17 through the drive motor unit and its associated gearing, sprockets 13 will in turn rotate in a counterclockwise direction causing image segments 4 to move past the display openings 2 and 2'. Normally, the chains will be activated to produce incremental and intermittent movement of the sprockets and drums so that each composite image is permitted to be viewed for a selected time period.

One-third of a turn of the drums will cause a new composite image to be displayed. This sequence of operation is continued until all the images have been displayed and, if desired, the sequence may be repeated, or may be reversed to display the images in the opposite order. The number of different images that a particular device can display may be varied; however, it has been found that devices designed to display twenty-five or thirty composite images operate satisfactorily.

I claim:
1. In a display device for presenting in a viewing position a sequence of composite images formed from groups of image segments, the improvement which comprises
   (1) a plurality of continuously-formed endless flexible display bands,
   (2) a plurality of image segments positioned immediately adjacent one another on each of said bands,
   (3) a plurality of substantially parallel band conveyors for conveying said bands, each of said conveyors comprising
      (a) a pair of spaced-apart triangular rotatable supports, said supports rotatable about substantially vertical axes,
   (4) support means for supporting said bands during their movement around said rotatable supports, said support means in turn comprising
      (a) a plurality of spaced-apart band-supporting flat surfaces formed on the corner areas of the upper end portions of said rotatable supports, said band-supporting flat surfaces positioned substantially in a horizontal plane,
      (b) a plurality of flat supportable surfaces on said bands which surfaces move with the band into and out of overlying engagement with said upper band-supporting flat surfaces, said supportable surfaces being positioned substantially in a horizontal plane, said band-supporting surfaces and said supportable surfaces being arranged in such a manner that at least one supportable surface is at all time during the operation of the display device in engagement with a band-supporting surface on each of said rotatable supports thus providing at all times support of each band on each rotatable support,
   (5) engageable means positioned on each of said rotatable supports, said engageable means being positioned substantially in a horizontal plane,
   (6) an endless flexible drive element engaging simultaneously each of said engageable means on said rotatable supports and positively driving all of said supports,
   (7) drive means for driving in rapid interrupted movement the flexible drive element
whereby the image segments of the display bands are rapidly moved into and out of said viewing position and successive groups of image segments are thereby displayed.

2. The display device of claim 1 in which the rotatable supports comprise shafts rotatably mounted and triangular drums mounted thereon in which the engageable means are sprockets and the endless flexible drive element is a chain.

References Cited by the Examiner
UNITED STATES PATENTS

| 843,889 | 2/1907 | Gilman et al. | 40—32 |
| 1,753,203 | 4/1930 | Hoetger | 40—32 |
| 1,797,773 | 3/1931 | Hoban | 40—76 |
| 2,231,590 | 2/1941 | Pflueger | 40—32 |
| 2,238,177 | 4/1941 | Marks et al. | 40—32 |
| 2,266,676 | 12/1941 | Carter | 40—32 |
| 2,680,316 | 6/1954 | Webster et al. | 40—76 X |
| 2,923,079 | 2/1960 | Bouchard | 40—32 |

FOREIGN PATENTS

| 22,900/29 | 6/1930 | Australia. |
| 476,822 | 6/1915 | France. |
| 572,547 | 2/1924 | France. |
| 587,238 | 1/1955 | France. |
| 662,098 | 3/1924 | France. |
| 534,861 | 3/1941 | Great Britain. |

EUGENE R. CAPOZIO, *Primary Examiner.*

J. WILL, W. GRIEB, *Assistant Examiners.*